July 21, 1942.                W. K. BERTHOLD                 2,290,798
            DUPLEX COMBINATION SETTLE BLOW HEAD AND BAFFLE MECHANISM
                        FOR GLASSWARE FORMING MACHINES
                            Filed Feb. 17, 1941

Witness:
B. X. Bartman

Inventor
Walter K. Berthold.
by Brown & Parham
Attorneys

Patented July 21, 1942

2,290,798

UNITED STATES PATENT OFFICE 2,290,798

DUPLEX COMBINATION SETTLE BLOW HEAD AND BAFFLE MECHANISM FOR GLASSWARE FORMING MACHINES

Walter K. Berthold, Rockville, Conn., assignor to Hartford-Empire Company, Hartford, Conn., a corporation of Delaware Application February 17, 1941, Serial No. 379,276

2 Claims. (Cl. 49—18)

This invention relates generally to mechanisms for supporting combination settle blow heads and baffles for movements to and from operative positions at the upper ends of inverted blank molds of glassware forming machines.

An object of the present invention is to provide a mechanism which will include a pair of similar combination settle blow heads and baffles together with simple, reliable and efficient means for supporting them for movement in unison toward and from operative positions in relation to the glass charge receiving cavities of a double cavity blank mold with which such combination settle blow heads and baffles are designed to cooperate.

A further object of the present invention is to provide a mechanism of the character described for movably supporting the pair of combination settle blow heads and baffles, or other suitable twin elements of a glassware machine, so that each can move vertically relative to the other sufficiently to permit the individual combination settle blow heads and baffles or other elements to seat at slightly different levels on the blank mold with which they are to cooperate.

Figure 1:
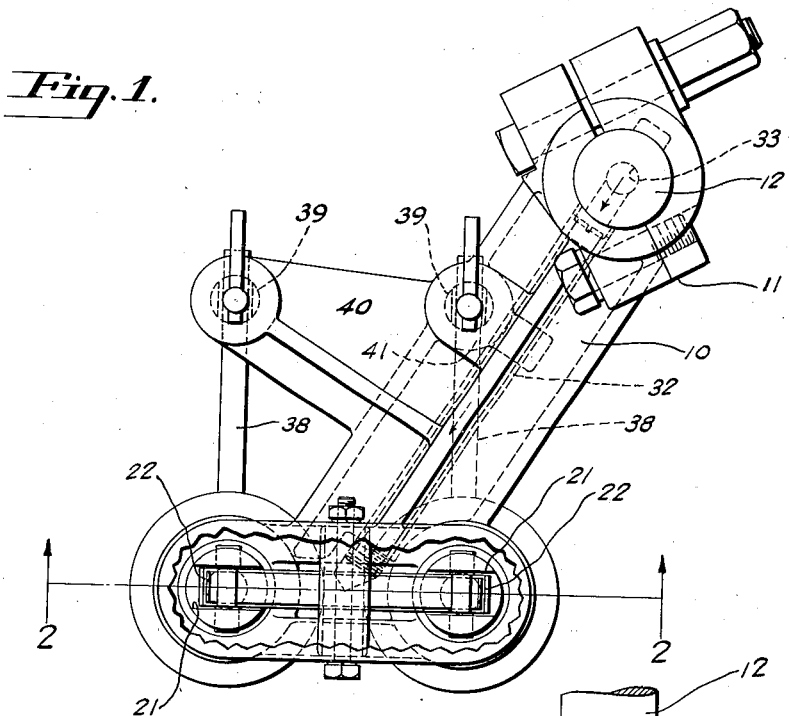
Figure 2:
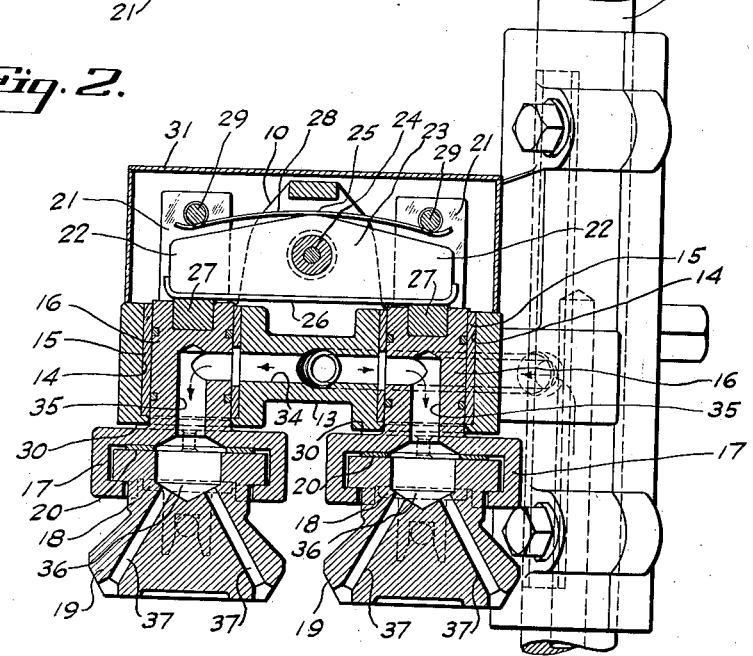

Other objects and advantages of the invention will hereinafter be pointed out or will become apparent from the following description of a practical embodiment of the invention, as shown in the accompanying drawing, in which:

Figure 1 is a plan view of a duplex combination settle blow head and baffle mechanism of the present invention, a portion of a top cover or casing of the mechanism being broken away to reveal underlying parts; and Fig. 2 is a vertical section through the mechanism, taken substantially along the line 2—2 of Fig. 1.

In the mechanism shown in the drawing, a substantially horizontal supporting arm of the mechanism is indicated at 10. This arm may be adjustably secured at one end, as by the fastening means indicated generally at 11, to a vertical main supporting shaft 12. The arrangement may be such as to permit the arm 10 to be secured to the shaft 12 at various vertically adjusted positions along the latter and also to permit limited angular adjustment of the arm 10 with respect to the axis of the shaft 12.

The free end portion of the arm 10 is provided with a hollow supporting head 13 which may be integral with the arm 10 or may have been formed separately therefrom and secured thereto in any suitable known way. The supporting head 13 is formed to provide a pair of vertical bores 14. Liners 15 of material relatively resistant to wear may be provided in the bores 14 as journals for vertically movable short vertical shafts 16.

Coupling members 17, each of which may constitute an element of a bayonet joint, are carried by the shafts 16 at the lower ends of the latter and below the supporting head 18. These coupling members 17 may be formed as enlarged open-bottomed hollow integral portions of the shafts 16 or may be formed separately and secured to the shafts in any suitable known way. A cooperative coupling member 18 is provided at the top or upper portion of a combination blow head and baffle 19 for engaging the coupling member 17 in the manner usual in effecting engagement of the cooperative elements of a bayonet joint. The combination blow head and baffle 19 then will be supported by a shaft 16. There is one such combination blow head and baffle for each of the shafts 16. A sealing washer or gasket, as indicated at 20, Fig. 2, may be provided within each of the coupling members 17 in contact with the top surface of the combination blow head and baffle 19 that is held in such member 17.

The shafts 16 may have their upper portions bifurcated vertically by vertical slots 21 extending therein from above the level of the supporting head 13 to the upper ends of the shafts. The vertical space or slot 21 between the furcations of the upper end portion of each shaft 16 is adapted to receive an end portion 22 of a cross bar or equalizer 23 which is pivoted intermediate its length on a horizontal supporting pivot pin 24. The upper surface of the cross bar 23 may have the configuration of a relatively wide obtuse angle, when viewed in elevation, the apex of this top surface, indicated at 25, being directly above the axis of the pivot pin 24 when the member 23 is exactly horizontal. The cross bar 23 may have a thin strip 26 of material relatively resistant to wear disposed on its lower surface for contact with wear-resistant slightly protruding inserts 27 in the portions of the vertical shafts 16 at the bottoms of the slots 21.

An elongate spring, in the form of a rod or bar 28 is disposed above the cross bar 23 so as to bear at its middle portion with the apex or crest of the angular upper surface of the bar 23. The end portions of this spring are engaged with cross pins 29 which are carried by the slotted portions of the shafts 16 above the end portions 22 of the cross bar 23. As shown, the end portions of the spring are coiled around the cross pins 29. The lowermost surfaces of these cross pins may be located below the level of the apex 25 of the cross bar 23 so that the end portions of the spring 28 will be flexed downwardly, the crest of the cross bar 25 acting as a fulcrum for the spring, which thus will exert upward pressure on the cross pins 29 and on the shafts 16. Such pressure will tend to maintain these shafts continuously against the bottom surfaces of the end portion 22 of the cross bar 23 and the cross bar horizontal. The shafts 16, in their raised positions, will support the coupling members 17 at short distances below the lower surface of the supporting head 13. As shown in Fig. 2, similar spaces, indicated at 30, exist between the coupling members 17 and the adjacent overlying portions of the supporting head 13.

A protective hollow hood or casing top 31 may be provided on the supporting head 13 to house the upper portions of the shafts 16 and the adjacent parts of the mechanism.

The supporting arm 10 may be provided with an internal passage or tube 32 in communication at its inner end with a vertical passage 33 in the main supporting shaft 12. This tube or passage 32 communicates at its opposite or outer end with a chamber or cross passage 34 in the supporting head 13. The cross passage 34 communicates with passages 35 formed in the lower portions of the shafts 16. The passages 35 communicate through suitable apertures in the coupling members 17 and 18 with a space 36 in the top of each of the combination blow head and baffles 19 and thence with inclined blowing passages 37 in each of the latter.

The main supporting shaft 12 may be provided with supporting and operating mechanism similar to that disclosed in a patent to Ingle 1,911,119 of May 23, 1933, for supporting and operating the shaft 88 of the blow head and baffle mechanism shown in Fig. 15 of that patent. Likewise, the communicating passages herein described may be supplied with blowing pressure fluid at the proper times by mechanism such as is disclosed in the aforesaid Ingle Patent 1,911,119 for supplying blowing pressure to the passage 117 in the shaft 88 of Fig. 15 of that patent. These mechanisms for supporting and operating the main shaft 12 and for supplying pressure fluid to the communicating passages in the mechanism of the present invention are preferred by me but any other suitable known mechanism may be provided in lieu of either of them.

The combination blow heads and baffles 19 may be provided with laterally extending rods 38 having their outer end portions engaged with slotted movement limiting members 39. The latter may be carried by brackets 40 and 41, respectively, on the supporting arm 10. The function of the cooperative rods 38 and members 39 is to limit the angular turning movements of the combination settle blow heads and baffles about their vertical axes and especially to prevent accidental or unintended disengagement of the combination blow heads and baffles from their holders.

From the foregoing description of the details of the illustrated practical embodiment of the invention, the operation thereof will be readily understood. In use, the main supporting shaft 12 may be given the vertically reciprocatory and oscillatory or rotary movements required to move the supporting head 13 vertically and laterally cyclically as required to dispose the members 19 in desired relationships with a pair of cavities in a molding unit of a glassware forming machine for performance of the functions of such members in the formation by the machine of pairs of simultaneously produced articles of glassware. In the event that the surfaces of such a molding unit engaged by the combination blow heads and baffles are identical and are located in the same horizontal plane or at exactly the same level, and all other factors involved in the positioning of these members are the same, the lowering of the supporting head 13 to dispose the blow heads and baffle in operative positions will not cause any relative movement between the combination blow heads and baffles and their carrying head 13 or between each other. However, should different vertical movements of the two members 19 be required for proper seating of these members on their respective supporting surfaces, as because of differential wear on or machining of the contact surfaces of the underlying molding unit or of the members 19, the latter will be vertically self-adjusting as to their positions on the molding unit. This is because one of them can move upward relative to the supporting head 13 to a limited extent determined by the heighth of the space 30 above the coupling member 17 if required while the other is moving downward to a like extent, this differential movement being resisted by but permitted by the spring 28 in contact with the cross bar or equalizer 23. This assures accurate and desirable contact of each of the members 19 with the portion of the molding unit with which it is to be associated for performance of a function involved in the manufacture of hollow glassware and tends to reduce or minimize wear on the contacting relatively moving parts during continued service.

The glassware forming machine twin elements coupled to and carried by the coupling members 17 may be blow heads only or baffles or bottom plates only, or any other forming machine twin elements which are adapted to be moved between raised inactive and lowered active positions by mechanism of the present invention.

Various modifications of and changes in the details of the illustrative structure shown in the drawing and herein described will be obvious to those skilled in the art and are within the purview of the invention.

I claim:

1. In a mechanism of the character described, a movable carrier including a supporting head, a pair of vertical shafts mounted in said head for axial movements relative to the head, a pair of combination baffles and blow heads carried by said shafts at the lower ends of the latter, said shafts having vertically slotted upper end portions extending above said supporting head, cross pins fixed to the slotted upper end portions of said shaft to span the slots therein, a cross bar pivoted intermediate its length for rocking movements about a horizontal axis located midway between the slotted upper end portions of the levers, said cross bar having similar end portions projecting into the slots beneath said cross pins, and an elongate spring bearing intermediate its length on said cross bar directly above said horizontal axis and engaged at its end portions with said cross pins to flex said spring at its place of contact with the cross bar and thereby tend to maintain said cross bar horizontal and the shafts in contact at the bottoms of their slots with the end portions of said cross bar.

2. In a mechanism of the character described, a movable carrier including a supporting head, a pair of vertical shafts mounted in said head for axial movements relative to the head, a pair of similar glassware forming machine elements carried by said shafts at the lower ends of the latter, a cross bar pivoted intermediate its length for rocking movements about a horizontal axis located midway between the vertical axial lines of said vertical shafts and so that the opposite end portions of said cross bar overlie upwardly facing portions of said vertical shafts, and spring means acting upon said cross bar and said vertical shafts to tend to maintain said cross bar horizontal and the vertical shafts raised relative to said head into contact at their said upwardly facing portions with the overlying end portions of said cross bar.

WALTER K. BERTHOLD.